United States Patent [19]

Tang

[11] Patent Number: 4,686,266

[45] Date of Patent: Aug. 11, 1987

[54] BIS(ALLYL CARBONATE) MONOMER AND METHOD FOR POLYMERIZING SAME

[75] Inventor: Robert H. Tang, Norton, Ohio

[73] Assignee: PPG Industries, Inc., Pittsburgh, Pa.

[21] Appl. No.: 858,316

[22] Filed: May 1, 1986

Related U.S. Application Data

[62] Division of Ser. No. 674,115, Nov. 23, 1984, Pat. No. 4,613,656.

[51] Int. Cl.$^4$ ............................................. C08F 110/00
[52] U.S. Cl. ................................ 526/193; 526/230.5; 526/314
[58] Field of Search ............... 526/62, 230.5, 314, 526/291, 294, 193; 525/263, 277

[56] References Cited

U.S. PATENT DOCUMENTS 2,464,062  3/1949  Straw .................................... 526/62
3,326,859  6/1967  Seiner .................................. 526/230.5
4,590,008  5/1986  Tang et al. ........................... 526/230.5

*Primary Examiner*—Paul R. Michl
*Assistant Examiner*—Peter D. Mulcahy
*Attorney, Agent, or Firm*—Irwin M. Stein

[57] ABSTRACT

Fully cured, intact, solid castings of bis(allyl carbonate) resin, e.g., diethylene glycol bis(allyl carbonate), are prepared by polymerizing the resin with between about 0.75 and about 1.50 parts, per hundred parts of resin, of a monoperoxycarbonate, e.g., tertiarybutylperoxy isopropyl carbonate. An adhesion reducing amount, e.g., between about 25 and about 75 parts, per million parts of resin, of a mold release agent is incorporated into the liquid resin monomer to avoid cracking of the casting. Use of a mold release agent is not required when the resin is prepolymerized to about 15–20 percent allylic utilization.

8 Claims, No Drawings

BIS(ALLYL CARBONATE) MONOMER AND METHOD FOR POLYMERIZING SAME

This is a division of application Ser. No. 674,115, filed Nov. 23, 1984, now U.S. Pat. No. 4,613,656.

DESCRIPTION OF THE INVENTION

Polyol(allyl carbonate) monomers are polymerized by free radical initiators to yield hard polymers. Many of these monomers yield rigid polymers that are essentially transparent to visible light, are substantially colorless, have indices of optical refraction of from about 1.45 to about 1.55, and possess a Barcol hardness above about 20. For these reasons, such monomers find utility as a precursor for transparent coatings, optical lenses and other optical elements, and flat or curved transparent sheets.

Free radical initiators that are typically recommended for use with polyol(allyl carbonate) monomers, such as diethylene glycol bis(allyl carbonate), are diisopropyl peroxydicarbonate (IPP) and benzoyl peroxide (BPO). At room temperatures, IPP has a relatively short halflife and consequently allows the initial stages of polymerization of the aforementioned bis(allyl carbonate) monomer to commence at about 45° C. However, once admixed with the monomer, the resultant liquid mixture must be utilized promptly for the reason that the pot-life of the mixture is short. If not used immediately, the mixture of monomer and initiator must be refrigerated.

Benzoyl peroxide has a longer half-life at room temperatures than IPP. The initial stages of the polymerization of diethylene glycol bis(allyl carbonate) using benzoyl peroxide commence at about 70° C. i.e., about 25° C. higher than with IPP. However, benzoyl peroxide is suspected of causing yellowing of bis(allyl carbonate) polymerizates. Moreover, the higher polymerization temperatures used with benzoyl peroxide may also result in a polymerizate that is more yellow than polymerizates prepared with, for example, diisopropyl peroxydicarbonate.

The monoperoxycarbonate, tertiarybutylperoxy isopropyl carbonate, has been described as an initiator that may be used for the polymerization of polyol(allyl carbonate) monomers. See, for example, U.S. Pat. Nos. 4,398,008 and 4,396,737, the latter describing the use of such monoperoxy carbonate in combination with IPP. However, the use of tertiarybutylperoxy isopropyl carbonate (BPIC) in quantities similar to IPP, e.g., between about 3 and about 4 parts of initiator per hundred parts of monomer, as the sole organic peroxide initiator for curing diethylene glycol bis(allyl carbonate) monomer results in polymerizates having too high a yellow cast for optical applications. In addition, the castings are often found to be cracked when removed from the molds.

It has now been discovered that fully cured, substantially clear, hard, intact castings of polyol bis(allyl carbonate) monomer, e.g., diethylene glycol bis(allyl carbonate), can be obtained utilizing monoperoxycarbonate initiators, such as BPIC, as the sole organic peroxide initiator. In accordance with one embodiment of this discovery, a small amount of a mold release agent is admixed with the bis(allyl carbonate) and the resultant mixture polymerized with between about 0.75 and about 1.50 parts, per hundred parts of polyol bis(allyl carbonate), of monoperoxycarbonate initiator such as BPIC. Polymerization is effected by exposing the peroxide-containing bis(allyl carbonate)-mold release agent mixture to a thermal zone in which temperatures sufficient to polymerize the polyol bis(allyl carbonate) but insufficient to burn or char the surface of the cured polymerizate are maintained. In another embodiment of the present invention, the polyol bis(allyl carbonate) is partially polymerized until from 15 to 50 percent allylic utilization is achieved and the resulting prepolymer polymerized with the monoperoxycarbonate initiator. Use of a mold release agent may be omitted when utilizing the prepolymer.

DETAILED DESCRIPTION OF THE INVENTION

In accordance with the present invention, polyol bis(allyl carbonate) is polymerized utilizing, as the sole initiator, monoperoxycarbonate represented by the graphic formula,

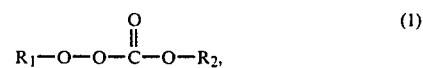

wherein $R_1$ is a tertiary $C_4$–$C_5$ alkyl, e.g., tertiary butyl and tertiary amyl, and $R_2$ is a $C_3$–$C_7$ alkyl. Examples of alkyl radicals representative of $R_2$ include: isopropyl, n-propyl, isobutyl, secondary butyl, n-butyl, secondary amyl, isoamyl, n-amyl, secondary hexyl, isohexyl, n-hexyl, n-heptyl and 2,4-dimethyl-3-pentyl. Preferred as $R_2$ are secondary $C_3$–$C_7$ alkyls such as isopropyl, secondary butyl, and 2,4-dimethyl-3-pentyl. Particularly preferred monoperoxycarbonates are tertiarybutylperoxy isopropyl carbonate and tertiaryamylperoxy isopropyl carbonate.

The amount of monoperoxycarbonate initiator utilized to polymerize the polyol bis(allyl carbonate) is between about 0.75 and about 1.50 parts of the monoperoxycarbonate, per hundred parts of the bis(allyl carbonate) (PHM). Preferably, between about 0.75 and about 1 or 1.25 PHM of the monoperoxycarbonate initiator is used. Surprisingly, such relatively small amounts of initiator are sufficient to produce a fully cured solid article. By fully cured, is meant that the solid article exhibits a 15 second Barcol Hardness of at least 20.

In accordance with the present invention, an abherent compound is incorporated into the polyol (allyl carbonate) monomer or monomer composition in amounts sufficient to provide an intact, i.e., unbroken and uncracked, casting. The abherent compound (mold release agent) should be compatible with the bis(allyl carbonate) monomer or monomer composition and not adversely affect the physical properties of the casting. More particularly, the mold release agent should not adversely affect the physical properties most characteristic of the cured polymerizate such as its rigidity, hardness, index of optical refraction, transmission of visible light and absence of any coloring which affects optical clarity. The mold release agent should, therefore, be a liquid or, if a solid, be soluble in the monomer or monomer composition.

Mold release agents that may be used include alkyl phosphates and stearates. Among the alkyl phosphates that may be used as a mold release agent are the mono and dialkyl phosphates (and mixtures of mono and dialkyl phosphates) which are commercially available under the trade names ORTHOLEUM ® 162 and ZE- LEC® UN. These alkyl phosphates are reported to have straight chain alkyl groups of from 16 to 18 carbon atoms.

Other mold release agents that may be used include stearic acid and the metal salts of stearic acid, e.g., stearic acid salts of the metals zinc, calcium, lead, magnesium, barium, cadmium, aluminum, and lithium. Other fatty acids and fatty acids salts may also be used, provided that they do not adversely effect the physical properties of the casting.

It is contemplated that between about 10 and about 100 parts of mold release agent per million parts of monomer or monomer composition (PPM) may be used without adversely effecting the properties of the casting, e.g., the hardness of the casting. More particularly, between about 20 and 75, preferably between 25 and 50 PPM of the mold release agent may be used. It has been found that higher quantities of the mold release agent, e.g., about 200 PPM of the anionic mold release agent (ZELEC® UN) results in the production of too soft a casting. Hence, the use of such quantities of mold release agent are to be avoided.

Castings prepared in accordance with the present invention should have physical properties substantially similar to the properties of castings of bis(allyl carbonate) polymerized with the conventional initiator diisopropyl peroxydicarbonate. In particular, for ophthalmic or optical use, the yellowness index should be less than about 2.0, preferably less than about 1.7 or 1.8 for a ¼ inch thick sheet. For non-ophthalmic use, a higher yellowness index value may be tolerated. As used herein and in the examples, the yellowness index value is determined spectrophotometrically using a Hunter Lab D25 P-2 Sphere Haze and Color Difference meter with a yellowness index option and the yellowness index determined in accordance with ASTM Test Method D1925-70.

The castings should also exhibit a 15 second Barcol Hardness of at least 20, preferably at least 23. Barcol hardness can be determined in accordance with ASTM Test Method D2583-81 using a Barcol Impressor. Further, the castings should have a percent transmission of visible light of at least about 90 percent and a percent haze of less than about 1.5 percent. Percent haze can be measured using a Hunter Lab Colorimeter, Model D25 P-2.

Polyol (allyl carbonate) monomers which may be utilized in the practice of the present invention are allyl carbonates of linear or branched aliphatic or aromatic liquid polyols, e.g., aliphatic glycol bis(allyl carbonate) compounds, or alkylidene bisphenol bis(allyl carbonate) compounds. These monomers can be described as unsaturated polycarbonates of polyols, e.g., glycols. The monomers can be prepared by procedures well known in the art, e.g., U.S. Pat. Nos. 2,370,567 and 2,403,113. In the latter patent, the monomers are prepared by treating the polyol, e.g., glycol, with phosgene at temperatures between 0° C. and 20° C. to form the corresponding polychloroformate, e.g., dichloroformate. The polychloroformate is then reacted with an unsaturated alcohol in the presence of a suitable acid acceptor, e.g., pyridine, a tertiary amine, or an alkaline or alkaline earth metal hydroxide. Alternatively, the unsaturated alcohol can be reacted with phosgene and the resulting chloroformate reacted with the polyol in the presence of an alkaline reagent, as described in U.S. Pat. No. 2,370,567.

The polyol (allyl carbonate) monomers can be represented by the graphic formula:

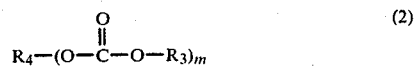

wherein $R_3$ is the radical derived from the unsaturated alcohol and is an allyl or substituted allyl group, $R_4$ is the radical derived from the polyol, and m is a whole number from 2–5, preferably 2. The allyl group ($R_3$) can be substituted at the 2-position with a halogen, most notably chlorine or bromine, or an alkyl group containing from 1 to 4 carbon atoms, generally a methyl or ethyl group. The $R_3$ radical can be represented by the graphic formula:

wherein $R_o$ is hydrogen, halogen, or a $C_1$–$C_4$ alkyl group. Specific examples of $R_3$ include the groups: allyl, 2-chloroallyl, 2-bromoallyl, 2-fluoroallyl, 2-methallyl, 2-ethylallyl, 2-isopropylallyl, 2-n-propylallyl, and 2-n-butylallyl. Most commonly, $R_3$ is the allyl group, $CH_2=CH-CH_2-$.

$R_4$ is a polyvalent radical derived from the polyol, which can be an aliphatic or aromatic polyol that contains 2, 3, 4, or 5 hydroxy groups. Typically, the polyol contains 2 hydroxy groups, i.e., a glycol or bisphenol. The aliphatic polyol can be linear or branched and contain from 2 to 10 carbon atoms. Commonly, the aliphatic polyol is an alkylene glycol having from 2 to 4 carbon atoms or a poly($C_2$–$C_4$) alkylene glycol, i.e., ethylene glycol, propylene glycol, trimethylene glycol, tetramethylene glycol, or diethylene glycol, triethylene glycol, etc.

The aromatic polyol can be represented by the graphic formula:

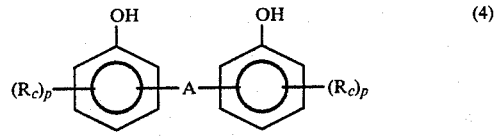

wherein A is a divalent alkyl radical, e.g., an alkylidene radical, having from 1 to 4 carbon atoms, e.g., methylene, ethylidene, dimethylmethylene (isopropylidene), $R_c$ represents lower alkyl substituents of from 1 to 3 carbon atoms, and p is 0, 1, 2, or 3. Preferably, the hydroxyl group is in the ortho or para position.

Specific examples of the radical $R_4$ include: alkylene groups containing from 2 to 10 carbon atoms such as ethylene, ($-CH_2-CH_2-$) trimethylene, methylethylene, tetramethylene, ethylethylene, pentamethylene, hexamethylene, 2-methylhexamethylene, octamethylene, and decamethylene; alkylene ether groups such as $-CH_2-O-CH_2-$, $-CH_2CH_2-O-CH_2CH_2-$, $-CH_2-O-CH_2CH_2-$, and $-CH_2CH_2CH_2-O-CH_2CH_2CH_2-$; alkylene polyether groups such as $-CH_2CH_2-O-CH_2CH_2-O-CH_2CH_2-$ and $-CH_2CH_2CH_2-O-CH_2CH_2CH_2-O-CH_2CH_2CH_2-$; alkylene carbonate and alkylene ether carbonate groups such as $-CH_2CH_2-O-CO-O-CH_2CH_2-$ and $-CH_2CH_2-O-CH_2CH_2-O-CO-O-CH_2C$-

$H_2$—O—$CH_2CH_2$—; and isopropylidene bis(para-phenyl), i.e.,

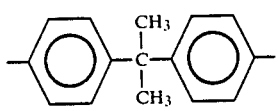
(5)

Most commonly, $R_4$ is —$CH_2CH_2$—, —$CH_2CH_2$—O—$CH_2CH_2$—, or —$CH_2CH_2$—O—$CH_2CH_2$—O—$CH_2CH_2$—.

More particularly, the preferred polyol (allyl carbonate) monomer that may be used in the practice of the present invention can be repreesnted by the graphic formula:

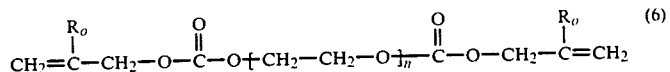
(6)

wherein $R_o$ is defined above and n is a whole number of from 1 to 3.

Specific examples of polyol (allyl carbonate) monomers herein contemplated include: ethylene glycol bis(2-chloroallyl carbonate), ethylene glycol bis(allyl carbonate), diethylene glycol bis(2-methallyl carbonate), diethylene glycol bis(allyl carbonate), triethylene glycol bis(allyl carbonate), propylene glycol bis(2-ethylallyl carbonate), 1,3propanediol bis(allyl carbonate), 1,3-butanediol bis(allyl carbonate), 1,4-butanediol bis(2-bromoallyl carbonate), dipropylene glycol bis(allyl carbonate), trimethylene glycol bis(2-ethylallyl carbonate), pentamethylene glycol bis(allyl carbonate), and isopropylidene bisphenol bis(allyl carbonate). Diethylene glycol bis(allyl carbonate) is preferred. This monomer is commercially available from PPG industries, Inc. and is sold under the trademark CR-39 Allyl Diglycol Carbonate.

Because of the process by which the polyol(allyl carbonate) monomer is prepared, i.e., by phosgenation of the polyol (or allyl alcohol) and subsequent esterification by the allyl alcohol (or polyol), the monomer product can contain related monomer species in which the moiety connecting the allyl carbonate groups contains one or more carbonate groups. These related monomer species can be represented by the graphic formula:

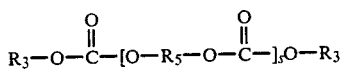
(7)

wherein $R_3$ is as defined above with respect to graphic formula (2), $R_5$ is a divalent, radical, e.g, alkylene or phenylene, derived from a diol, and s is a whole number from 2 to 5. The related monomer species of diethylene glycol bis(allyl carbonate) can be represented by the graphic formula,

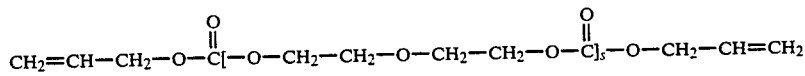
(8)

The polyol (allyl carbonate) monomer can typically contain from 2 to 20 weight percent of the related monomer species and such related monomer species can be present as mixtures, i.e., mixtures of the species represented by s being equal to 2, 3, 4 etc.

As used in the present description and claims, the term polyol(allyl carbonate) monomer or like names, e.g., diethylene glycol bis(allyl carbonate), are intended to mean and include the named monomer and any related monomer species contained therein, as well as prethickened monomer, i.e., gel-free monomer of less than about 10 percent allylic utilization.

In accordance with a further embodiment of the present invention, castings of polyol(allyl carbonate) monomer can be prepared utilizing the monoperoxycarbonate initiators described herein by using a prepolymer of the polyol(allyl carbonate) monomer that has between about 15 and 50, e.g., 20 to 50, percent of the unsaturated (allylic) carbon-carbon linkages consumed. Such liquid polymer and its preparation is described in European patent application Ser. No. 144,782, published June 19, 1985.

In accordance with the method described in the aforesaid copending application, the polyol(allyl carbonate) monomer is dissolved in a suitable organic solvent, such as methylene chloride, and partially polymerized with a small amount of peroxy initiator, e.g., peroxydicarbonate initiator such as IPP, until between about 15 and 50 percent allylic utilization, i.e., consumption of allylic carbon-carbon linkages, is attained. The solvent is removed, e.g., by evaporation, leaving a liquid polymer product that is a syrupy, substantially gel-free, pourable. viscous liquid of unpolymerized monomer and partially polymerized monomer (polymer). This liquid prepolymer product can be polymerized to a hardtransparent material in a manner similar to the polyol(allyl carbonate) monomer, although less initiator is required to polymerize the liquid prepolymer. The disclosure of European patent application Ser. No. 144,782 relating to the aforedescribed liquid prepolymer and its method of preparation are hereby incorporated, in toto, by reference.

Other copolymerizable materials may also be present in minor amounts, e.g., up to about 25 weight percent, with the polyol(allyl carbonate) monomer or liquid prepolymer. For example, other monomer(s), such as vinyl acetate and methyl methacrylate, may be included in amounts up to about 25 weight percent, e.g., between about 5 and 15 or 20 percent. Other monomeric materials and mixtures thereof that may be polymerized with the polyol(allyl carbonate) monomer, e.g., diethylene glycol bis(allyl carbonate), include methyl acrylate,ethyl acrylate, ethyl methacrylate, and allyl methacrylate. Typically, the polyol(allyl carbonate) monomer or liquid prepolymer will be present in the polymerizable mixture in amounts of at least 75 weight percent.

More particularly, U.S. Pat. No. 3,944,637 described copolymers of diethylene glycol bis(allyl carbonate) and from 10 to 12 weight percent methyl methacrylate. It also describes the copolymerization of diethylene glycol bis(allyl carbonate), methyl methacrylate and an acid selected from the group consisting of acrylic acid and methacrylic acid, the acid being present in amounts of between 0.5 and 5 weight percent, basis the monomer mixture.

As heretofore described, the polyol(allyl carbonate) monomer or liquid prepolymer to be polymerized in accordance with the practice of the present invention may also contain minor amounts of other copolymerizable materials which are described in the art as modifying the ultimate properties or processing characteristics of the polyol(allyl carbonate) polymerizate. According to a particular exemplification, a mono- or polyfunctional acrylate is added to the polyol (allyl carbonate) to be cured in amounts of at least about 5 weight percent of the acrylate additive, basis the polyoll(allyl carbonate). The amount of the acrylate component added should be such that the properties of the polymerized solid article, e.g., the optical and physical properties thereof, such as refractive index and abrasion resistance, are substantially the same as those of a polymerizate prepared from the monomer alone, i.e., without the acrylate additive.

Polyfunctional acrylate monomers that may be used as the acrylate additive are represented by the graphic formula:

$$R_7(OCR_6)_i \quad \overset{O}{\underset{\|}{}} \tag{9}$$

which is the reaction product of the polyol, $R_7(OH)_i$, and an alphabeta unsaturated carboxylic acid, $$R_6COH \quad \overset{O}{\underset{\|}{}} \tag{10}$$

wherein $R_6$ is the acrylic acid moiety,

(R' being hydrogen or a $C_1$-$C_4$ alkyl group; $R_7$ is the organic residue of the aliphatic polyl, which typically contains from 2 to 12, more typically 2 to 6, carbon atoms, and i is a whole number from 2 to 5, more usually 2 to 3. Preferably, the polyfunctional acrylate monomers are the di- or the triacrylates, more preferably the diacrylates.

Typically, $R_6$ is an acrylic acid moiety chosen from the group consisting of acrylic acid,

methacrylic acid,

and ethyl acrylic acid,

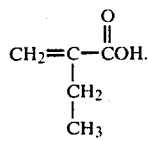

$R_7(OH)_i$ can be a diol, a triol, a tetracarbinol, or a pentacarbinol. Most commonly $R_7(OH)_i$ is a diol or triol. Typical diols include: alpha, omega-glycols such as ethylene glycol, trimethylene glycol, 1,4-butanediol, 1,5-pentane diol and 1,6-hexanediol, other 1,2-glycols, such as propylene glycol, the hydrated ethylene oxide and propylene oxide condensation products, such as diethylene glycol, triethylene glycol, tetraethylene glycol, dipropylene glycol, tripropylene glycol, tetrapropylene glycol and the like.

Examples of diacrylates include ethylene glycol diacrylate, ethylene glycol dimethacrylate, diethylene glycol diacrylate, diethylene glycol dimethacrylate, triethylene glycol diacrylate, triethylene glycol dimethacrylate, tetraethylene glycol diacrylate, tetraethylene glycol dimethacrylate, trimethylene glycol diacrylate, trimethylene glycol dimethacrylate, butanediol diacrylate, butanediol dimethacrylate, pentanediol diacrylate, pentanediol dimethacrylate, hexanediol diacrylate, hexanediol dimethacrylate, propylene glycol diacrylate, propylene glycol dimethacrylate, dipropylene glycol diacrylate, dipropylene glycol dimethacrylate, tripropylene glycol diacrylate, tripropylene glycol dimethacrylate, tetrapropylene glycol diacrylate, tetrapropylene glycol dimethacrylate, and the like.

Suitable triacrylates include trimethylolpropane triacrylate, trimethylolpropane trimethacrylate, glycerol triacrylate, glycerol trimethacrylate, pentaerythritol triacrylate, and pentaerythritol trimethacrylate. Suitable tetraacrylates include pentaerythritol tetraacrylate and pentaerythritol tetramethacrylate.

Difunctional acrylate monomers, i.e., diacrylates and dimethacrylates, are the preferred polyfunctional acrylate monomers. Preferred are the diacrylates and dimethacrylates of aliphatic diols. Especially preferred aliphatic diol diacrylates and dimethacrylates are those having from about 4 to about 15 atoms, i.e., carbon atoms or carbon and oxygen atoms, between the carbonyl carbon atoms.

Monofunctional acrylates that can be admixed with the polyol(allyl carbonate) monomer are typically chosen from the group consisting of $C_1$ to $C_4$, preferably $C_1$-$C_2$, alkyl and $C_5$-$C_6$ cycloalkyl, preferably cyclohexyl, esters of the acrylic type acid of graphic formula (10), most notably, acrylic acid, methacrylic acid and 2-methylenebutyric acid. Examples of monofunctional acrylates include: methyl acrylate, methyl methacrylate, ethyl methacrylate, butyl methacrylate, isobutyl methacrylate, and cyclohexyl methacrylate. The methacrylic acid esters, e.g., methyl methacrylate, are preferred.

A viscosity increasing monomeric material may be dispersed in the polyol(allyl carbonate) monomer, as described in U.S. Pat. No. 4,346,197. These monomeric materials are poylmers of olefinically unsaturated monomers. The polymers may be a monofunctional homopolymer, a copolymer of a monofunctional monomer, or a copolymer of a monofunctional monomer and a difunctional monomer. The difunctional monomer preferably has functional groups of high and low reactivity, e.g., a vinyl group and an allyl group, and the monofunctional monomer is commonly a vinyl monomer. Preferably, the copolymer is a copolymer of (a) an acrylate, i.e., an acrylate ester or an acrylic acid, and (b) an ester of an acrylic acid and an allyl alcohol or substituted allyl alcohol.

Examples of monofunctional homopolymers include: poly(vinyl acetate), poly(acrylic acid), poly(methacrylic acid), poly(methyl acrylate), poly(ethyl acrylate), poly(methyl methacrylate), and poly(ethyl methacrylate) and copolymers thereof. An example of a copolymer is a copolymer of methylmethacrylate and allylmethacrylate containing from about 80 to about 99 weight percent of the methyl methacrylate with the balance being allyl methacrylate. The disclose of U.S. Pat. No. 4,346,197 relating to such monomeric materials is hereby incorporated by reference.

Other materials such as allyl S-triazines and urethanes having acrylate functionality, as described in U.S. Pat. No. 4,360,653, may be present in the monomer or liquid prepolymer to modify the ultimate physical and thermal properties of the polymer casting. U.S. Pat. No. 4,139,578 describes the presence of unsaturated polyester and unsaturated copolymerizable monomer to decrease the shrinkage that occurs during polymerization of polyol(allyl carbonate) monomers.

Other copolymerizable monomeric materials that may be added to the polyol(allyl carbonate) resin are $C_1$-$C_4$ alkyl esters of unsaturated dicarboxylic acids, vinyl esters of $C_1$ to $C_3$ saturated monocarboxylic acids, and styrene. These materials may be present in amounts of from 5 to 20, e.g., 5 to 10, weight percent, basis the polyol(allyl carbonate) monomer. Examples of such monomers include: $C_1$-$C_2$ alkyl esters of unsaturated $C_4$-$C_6$ dicarboxylic acids. As the unsaturated dicarboxylic acid, there can be mentioned maleic, fumaric, itaconic, citraconic, ethylmaleic and mesaconic acids. Alcohols used to prepare the esters of the mono- and dicarboxylic acids include $C_1$-$C_4$ alkanols, e.g., methanol, ethanol, propanol, isopropanol, the butanols, cyclopentanol and cyclohexanol.

Examples of the esters of unsaturated dicarboxylic acids contemplated herein include: dimethyl maleate, diethyl maleate, methyl ethyl maleate, dimethyl fumarate, diethyl fumarate, and methyl ethyl fumarate.

Vinyl esters of lower members of saturated monocarboxylic acids can also be used as the unsaturated monofunctional monomer. In particular, there are contemplated the vinyl esters of $C_1$-$C_3$ saturated monocarboxylic acids, e.g., formic, acetic and propionic acids, such as vinyl acetate. Examples include vinyl acetate, vinyl formate, and vinyl propionate.

Various additives may be present also in the polymerizable liquid composition, e.g., colorants, dyes, photochromic agents, ultraviolet arsorbers and thermochromic agents, among others. Use of the monoperoxycarbonate initiator permits the preparation of color fast castings from polyol(allyl carbonate) monomer. In that embodiment, conventional dyes are added to the polymerizable monomer and yield a polymerizate of substantially the same color as the monomer composition. When such dyed monomer compositions are polymerized using IPP or BPO the color of the polymerizates are severly faded or change in color, e.g., a blue monomer composition yields a yellow-orange casting.

In accordance with the process of the present invention, the mixture of polyol(allyl carbonate) monomer and mold release agent or polyol(allyl carbonate) liquid prepolymer are polymerized by adding thereto the indicated amount of monoperoxycarbonate initiator and exposing the polymerizable composition to a thermal zone to initiate and conduct the polymerization. The thermal zone is commonly a forced air oven or a temperature control water bath. The time of polymerization, or cycle, is a function of the rate at which the heat of polymerization can be removed from the casting, which depends on the thickness of the article to be produced.

The polymerization temperature during the initial period of polymerization will generally be between about 60° C. and about 110° C. The temperature during polymerization may be constant, gradually increasing or be increased stepwise. The time-temperature relationship for the cure cycle of the polyol(allyl carbonate) monomer or prepolymer composition can vary depending on the nature of the equipment available. Because the monoperoxycarbonate initiator used is active at relatively high temperatures, it is important to control the temperature of the polymerization so that the temperature within the casting does not exceed 100° C. for any significant period of time or the surface of the casting may become charred, bubbles may appear within the casting, and/or the casting may crack due to high temperatures generated within the casting during polymerization as a result of poor heat removal from the casting.

For castings up to about ⅛ of an inch in thickness, the initial curing time for the monomer material will be between about 16 and 18 hours. Monomer mixtures containing cure rate enhancing additives and the liquid prepolymer may be polymerized to a solid cured article that can be removed from the mold and easily handled in a shorter time. Thicker materials may require more than the 16-18 hours for initial cure time since it takes longer to remove the heat generated during polymerization from a thick casting than from a thin one.

After the polymerization is substantially complete, i.e., the polymerizate can be physically handled without adverse effects, the polymerized article can be removed from the mold in which it is made and subjected to a post-cure heat treatment of from about 1 to 3 hours at temperatures of from about 110°-125° C. Care should be observed in the post-cure treatment for the reason that the polyol(allyl carbonate) castings tend to yellow with prolonged exposure to such temperature.

In one embodiment of the practice of the present invention, diethylene glycol bis(allyl carbonate) is mixed with 50 parts per million (PPM) of an anionic alkyl phosphate mold release agent and polymerized with 1.0 phm tertiarybutylperoxy isopropyl carbonate in an oven at 90° C. for 16 hours. At the end of this cure period, the casting is post-cured by slowly raising the temperature of the oven to 120° C. over 3 hours.

The present invention is more particularly described in the following examples, which are intended as illustrative only since numerous modifications and variations therein will be apparent to those skilled in the art.

EXAMPLE I

Diethylene glycol bis(allyl carbonate) monomer was mixed with four parts (per hundred parts of monomer) of tertiarybutylperoxy isopropyl carbonate (BPIC) in a 150 millileter (ml) beaker. The resulting solution was charged into a glass mold constructed of two 20 centimeter x 20 centimeter glass plates separated by a U-shaped plastic gasket that was 0.125 inches (3.18 millimeters) thick. The glass mold was held together by means of large binder clips. After filling the mold with the monomer-initiator mixture, the mold was placed inside a hot air oven where the temperature was maintained at 90° C. for 16 hours. At the end of this initial polymerization period, the oven temperature was raised from 90° C. to 110° C. in ½ hour. Thereafter the plastic vinyl gasket was removed from the mold and the oven temperature raised from 110° C. to 120° C. in 2½ hours. The mold was then allowed to cool to room temperature and the casting removed from the mold. The plastic vinyl gasket was removed from the mold for the post cure for the reason that the material from which the gasket was fabricated was not resistant to temperatures in excess of 110° C. The resulting casting was found to be cracked. The percent visible light transmission, percent haze, yellowness index, and Barcol hardness of the casting was measured and the results obtained tabulated in Table I.

The aforesaid procedure was repeated with varying amounts of tertiarybutylperoxy isopropyl carbonate initiator and the aforesaid physical properties of the resulting castings measured. The results obtained are tabulated in Table I. In some cases, the casting prepared was 0.250 inches (6.35 millimeters) thick by utilizing a U-shaped vinyl gasket of that thickness. All of the castings so produced were found to be cracked.

TABLE I

| BPIC, phm | Transmission, %* | % Haze* | Yellowness Index | Barcol Hardness 0 | Barcol Hardness 15 sec. | Casting Thickness, mm |
|---|---|---|---|---|---|---|
| 4.00 | 92.2 | 0.4 | 2.6 | 38 | 30 | 3.18 |
| 3.00 | 92.0 | 0.7 | 3.0 | 36 | 29 | 3.18 |
| 2.00 | 92.3 | 1.2 | 1.5 | 36 | 28 | 3.18 |
| 1.50 | 92.4 | 1.0 | 1.1 | 35 | 27 | 3.18 |
| 1.00 | 93.8 | 1.4 | 1.1 | 34 | 26 | 3.18 |
| 1.25 | 92.2 | 1.1 | 2.1 | 36 | 28 | 6.35 |
| 1.00 | 91.5 | 0.8 | 1.5 | 36 | 27 | 6.35 |
| 0.75 | 92.4 | 0.7 | 0.9 | 26 | 17 | 6.35 |
| 0.50 | 92.2 | 1.0 | 0.6 | 13 | 0 | 6.35 |

*Data affected by size of sample available for property measurement due to breakage of castings.

EXAMPLE II

The procedure of Example I was used to prepare a ¼ inch (6.35 mm) thick casting utilizing 1 PHM of tertiarybutylperoxy isopropyl carbonate (BPIC) and 25 parts of ZELEC ® UN mold release agent per million parts of monomer (PPM) and the Barcol hardness of the resulting casting was measured.

The aforesaid procedure was repeated except that 50 PPM of ZELEC ® UN mold release agent was used. Additional ⅛ inch (3.18 mm) castings were prepared utilizing 1 PHM of BPIC and 200 PPM ZELEC ® UN mold release agent and 0.85 PHM BPIC with 400 PPM of the mold release agent. The data is tabulated in Table II. The castings prepared with 25 and 50 PPM of the mold release agent were intact and not cracked.

TABLE II

| Mold Release Agent, ppm | BPIC, phm | Barcol Hardness 0 | Barcol Hardness 15 sec. | Casting Thickness, (mm) |
|---|---|---|---|---|
| 400 | 0.85 | 0 | 0 | 3.18 |
| 200 | 1.00 | 8 | 0 | 3.18 |
| 50 | 1.00 | 33 | 24 | 6.35 |
| 25 | 1.00 | 32 | 23 | 6.35 |

The results of Table II show that castings of acceptable hardness can be obtained utilizing tertiarybutylperoxy isopropyl carbonate as the intiator for the polymerization of the polyol(ally carbonate) monomer, diethylene glycol bis(allyl carbonate). The data also shows that use of significantly higher levels of the mold release agent results in the formation of castings that are too soft for commercial applications.

EXAMPLE III

The procedure of Example I was utilized to prepare four ¼ inch (6.35 mm) castings of diethylene glycol bis(allyl carbonate). The monomer in each case was mixed with 50 PPM of ZELEC ® UN mold release agent and the castings were polymerized with 1.0 PPM tertiarybutylperoxy isopropyl carbonate (BPIC). Similar castings were prepared using the same cure cycle but without the addition of the mold release agent and using, as the initiator, 3.5 PHM diisopropyl peroxydicarbonate (IPP). Results are tabulated in Table III and are reported as an average of the four castings unless a range is specified.

TABLE III

| Initiator | Transmission, % | % Haze | Yellowness Index | Barcol Hardness 0 | Barcol Hardness 15 sec. |
|---|---|---|---|---|---|
| IPP, 3.5 PHM | 92.5 | 0.4–0.8 | 1.1–1.6 | 34 | 26 |
| BPIC, 1.0 PHM | 92.3 | 0.5 | 1.3–1.7 | 34 | 25 |

The data of Table III show that castings very similar in light transmission, percent haze, yellowness index and Barcol Hardness can be produced using tertiarybutylperoxy isopropyl carbonate with an adhesion reducing amount of an abherent, such as ZELEC ® UN mold release agent.

EXAMPLE IV

Liquid diethylene glycol bis(allyl carbonate) prepolymer having about 33 percent allylic utilization was polymerized with varying amounts of tertiarybutylperoxy isopropyl carbonate (BPIC) initiator utilizing the cure cycle described in Example I to form ¼ inch (6.35 mm) sheet castings. The resulting castings were intact and neither broken nor cracked. The percent visible light transmission, percent haze, yellowness index and Barcol hardness of the resulting castings were measured. Data is tabulated in Table IV.

TABLE IV

| BPIC, phm | Transmission, % | % Haze | Yellowness Index | Barcol Hardness 0 | Barcol Hardness 15 sec. |
|---|---|---|---|---|---|
| 1.00 | 92.3 | 0.4 | 2.7 | 38 | 27 |
| 0.75 | 92.5 | 0.6 | 1.9 | 33 | 23 |
| 0.50 | 92.8 | 0.3 | 1.2 | 21 | 8 |

The data of Table IV shows that castings of acceptable hardness and physical properties can be obtained utilizing tertiarybutylperoxy isopropyl carbonate without the need for a mold release agent. A yellowness index of 2.7 would not be acceptable for ophthalmic usage but would be useful for non-ophthalmic applications.

It is also contemplated that the polyol(allyl carbonate) monomer be mixed with the monoperoxycarbonate initiator, and the mold release agent added to the monomer initiator mixture prior to polymerization. Alternatively, the mold release agent may also be present in the monomer initiator batch mixture. For example, from about 0.75 to about 5 parts of the initiator, per hundred parts of monomer, can be added to the monomer and this mixture subsequently diluted with additional monomer or copolymerizable monomer to attain the desired initiator level of 0.75 to 1.50 parts per 100 parts of the polymerizable monomer mixture for the polymerization reaction. Advantageously from about 0.75 to about 2.5 parts of initiator, e.g., from about 1 to about 2 parts of initiator, per 100 parts of monomer are used. These "master batches" of the resininitiator mixture are stable at room temperature for reasonable storage periods. Care should, however, be observed that the mixtures are not exposed to elevated temperatures which will cause decomposition of the monoperoxycarbonate and polymerization of the monomer, e.g., by the application of external cooling during storage or transit in hot climates.

Although the present process has been described with reference to specific details of certain embodiments thereof, it is not intended that such details be regarded as limitations on the scope of the invention except as and to the extent that they are included in the accompanying claims.

What is claimed is:

1. In the method of polymerizing polyol(allyl carbonate) monomer represented by the graphic formula,

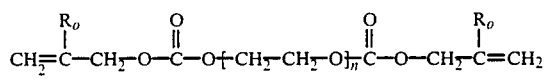

wherein $R_o$ is hydrogen, halogen or $C_1$-$C_4$ alkyl, and n is a whole number from 1 to 3, wherein the monomer is mixed with peroxide initiator and the resultant mixture exposed to a thermal zone to polymerize the monomer, the improvement which comprises utilizing as the monomer a prepolymer of the polyol(allyl carbonate) having between about 15 and 50 percent allylic utilization and utilizing, as the sole initiator, from about 0.75 to about 1.50 parts, per hundred parts of prepolymer, of a monoperoxycarbonate represented by the graphic formula:

wherein $R_1$ is a tertiary $C_4$-$C_5$ alkyl and $R_2$ is a $C_3$-$C_7$ alkyl, thereby to form a fully cured, intact solid article having a fifteen second Barcol hardness of at least 20.

2. The method of claim 1 wherein the polyol(allyl carbonate) is diethylene glycol bis(allyl carbonate).

3. The method of claim 2 wherein the diethylene glycol bis(allyl carbonate) prepolymer has between 20 and 50% allylic utilization.

4. The method of claim 1 wherein the initiator is tertiarybutylperoxy isopropyl carbonate.

5. The method of claim 2 wherein the initiator is tertiarybutylperoxy isopropyl carbonate.

6. A monomer initiator composition consisting essentially of polyol(allyl carbonate) monomer represented by the graphic formula,

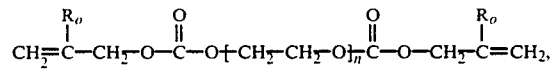

wherein $R_o$ is a hydrogen, halogen or $C_1$-$C_4$ alkyl, and n is a whole number from 1 to 3, and from 0.75 top 5 parts, per hundred parts of monomer of a monoperoxycarbonate represented by the graphic formula,

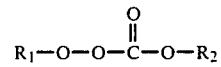

wherein $R_1$ is a tertiary $C_4$-$C_5$ alkyl and $R_2$ is a $C_3$-$C_7$ alkyl.

7. The composition of claim 6 wherein the monomer is diethylene glycol bis(allyl carbonate) and the initiator is tertiarybutylperoxy isopropyl carbonate.

8. The composition of claim 7 wherein from 0.75 to 2.5 parts of initiator are present.

* * * * *